Patented Sept. 20, 1938

2,130,952

UNITED STATES PATENT OFFICE 2,130,952

MANUFACTURE OF DERIVATIVES OF PARAFFIN WAX

David William Ferguson Hardie and Charles Ockrent, Liverpool, England, assignors to Imperial Chemical Industries Limited, a corporation of Great Britain No Drawing. Application July 2, 1937, Serial No. 151,764. In Great Britain July 1, 1936

10 Claims. (Cl. 260—660)

This invention relates to the manufacture of new derivatives of paraffin wax.

The chlorination of paraffin wax is a well known operation, the product obtained thereby being a viscous liquid or a solid, depending on the percentage of chlorine introduced. British Specifications Nos. 452,660 and 452,661 describe the treatment of chlorinated paraffin wax with alkalies to obtain unsaturated compounds, and the refining of these materials by molecular distillation.

The object of the present invention is to produce new chlorinated derivatives of paraffin wax. A further object is to devise a method of producing new chlorinated derivatives of paraffin wax. Further objects will appear hereinafter.

We have found that we can make new chlorinated derivates of paraffin wax by chlorinating the unsaturated compounds which results from treating chlorinated paraffin wax with alkalies.

Preferably the unsaturated compounds are obtained by treatment of the original chlorinated wax with an excess of alcoholic potash under pressure, and the final stages, at least, of the rechlorination are effected at elevated temperatures.

The following examples illustrate but do not limit the invention.

Example I

A chlorinated paraffin wax containing 46% chlorine was treated with a methyl alcohol solution of potassium hydroxide in an autoclave under pressure. The unsaturated product obtained in this manner was treated with gaseous chlorine first in the cold. The reaction caused the temperature to rise to about 45° C. After 30 hours, absorption of chlorine slowed down, and a sample of the product was removed. The remainder was then warmed to 85° C. and chlorine passed in for a further 50 hours. When reaction appeared to be complete, free chlorine and hydrogen chloride were removed from the product by air-blowing. The sample withdrawn after 30 hours was a very viscous liquid containing 43% chlorine, 49.6% of carbon and 7.4% of hydrogen, while the main product was a hard brown resin containing 52% chlorine, 42.4% of carbon and 5.6% of hydrogen; the resin melted below 100° C. and was very soluble in benzene, toluene, chloroform and similar solvents.

Example II

A paraffin wax fraction of setting point 130° F. was chlorinated to 20%. An unsaturated derivative of this chlorowax was then prepared by treating it with alcoholic potassium hydroxide under pressure. The unsaturated product was distilled under high vacuum conditions. Chlorine was passed into the unsaturated product for 40 hours, the temperature being maintained throughout within the range 75/80° C. The final product was freed from dissolved hydrogen chloride and chlorine by blowing a brisk stream of nitrogen through it at 80° C. The product in this case was a transparent, brittle resin which softened at 30/35° C., having a composition of 53.0% of chlorine, 41.3% of carbon and 5.7% of hydrogen.

If desired, the unsaturated compounds may be chlorinated in solution, for example, in carbon tetrachloride. In general, however, we do find that any advantage accrues from so doing, and indeed difficulty is frequently experienced in evaporating the last traces of solvent from the product. We prefer, therefore, to perform the chlorination in the absence of a solvent, and as the unsaturated material is normally a liquid this can be done by merely passing a stream of gas into it at ordinary temperatures. The viscosity of the product increases as the chlorination proceeds and there is an evolution of heat until the absorption of chlorine slows down, presumably after the saturation of the last double linkages. If desired, the chlorination may be terminated at this stage, and the product treated to remove any free chlorine and hydrogen chloride. Preferably, however, the chlorination is continued at elevated temperatures, e. g., 80–90° until practically no further reaction occurs. Usually the heat of reaction of the first stage is not great enough to raise the temperature of the reactants sufficiently for completing the reaction, and it is necessary to supply extra heat. It will, of course, be apparent that the first stage of the reaction may be conducted at an elevated temperature, in which case subsequent further heating is usually unnecessary.

We find that the rechlorinated bodies are quite different from the product having the same chlorine content and prepared by the direct chlorination of paraffin wax. The properties of the products depend on the number of the double linkages in the parent unsaturated compound, and thus on both the percentage of chlorine and the completeness with which it is eliminated. The products vary from very viscous yellowish liquids to brittle resins, those obtained by the preferred form of our invention from a chlorinated wax originally containing not less than about 25% chlorine being yellow or brownish brittle resins which can be mixed with other resins and plasticized, thus being capable of application to a variety of purposes. Products of a light colour are obtained if the unsaturated body is subjected to a molecular distillation before it is rechlorinated, but this step is not essential to our invention. If the rechlorination is permitted to go to completion the final products contain 50-60% of chlorine.

As many apparently widely different embodiments of this invention may be made without departing from the spirit and scope thereof, it is to be understood that we do not limit ourselves to the specific embodiments thereof except as defined in the appended claims.

We claim:

1. A process for the manufacture of new chlorinated derivatives of paraffin wax which comprises reacting chlorinated paraffin wax having a chlorine content of at least about 20% with alcoholic alkali so as to obtain unsaturated derivatives of paraffin wax and then chlorinating the said unsaturated derivatives with elemental chlorine to a chlorine content of at least about 40%.

2. A process for the manufacture of new chlorinated derivatives of paraffin wax which comprises reacting chlorinated paraffin wax having a chlorine content of at least about 20% with alcoholic alkali so as to obtain unsaturated derivatives of paraffin wax, separating these unsaturated derivatives by molecular distillation, and then chlorinating said unsaturated derivatives with elemental chlorine to a chlorine content of at least about 40%.

3. A process as claimed in claim 1 where the final stages of the rechlorination are effected at a temperature of 80°-90° C.

4. A process as claimed in claim 2 where the final stages of the rechlorination are effected at a temperature of 80°-90° C.

5. As new products chlorinated derivatives of paraffin wax manufactured by the process claimed in claim 1.

6. As new products chlorinated derivatives of paraffin wax manufactured by the process claimed in claim 2.

7. As new products resin-like chlorinated paraffin wax containing 50 to 60 per cent of chlorine.

8. As a new product a resin-like chlorinated derivative of paraffin wax being composed of 42.4 per cent of carbon, 5.6 per cent of hydrogen and 52.0 per cent of chlorine.

9. As a new product a resin-like chlorinated derivative of paraffin wax being composed of 41.3 per cent of carbon, 5.7 per cent of hydrogen, and 53.0 per cent of chlorine.

10. As a new product a highly viscous liquid derivative of paraffin wax being composed of 49.6 per cent of carbon, 7.4 per cent of hydrogen, and 43 per cent of chlorine.

DAVID W. F. HARDIE.
CHARLES OCKRENT.

CERTIFICATE OF CORRECTION.

Patent No. 2,130,952. September 20, 1938.

DAVID WILLIAM FERGUSON HARDIE, ET AL.

It is hereby certified that error appears in the printed specification of the above numbered patent requiring correction as follows: Page 1, second column, line 18, for "we do find" read we do not find; and that the said Letters Patent should be read with this correction therein that the same may conform to the record of the case in the Patent Office.

Signed and sealed this 6th day of December, A. D. 1938.

Henry Van Arsdale (Seal) Acting Commissioner of Patents.

rinated wax originally containing not less than about 25% chlorine being yellow or brownish brittle resins which can be mixed with other resins and plasticized, thus being capable of application to a variety of purposes. Products of a light colour are obtained if the unsaturated body is subjected to a molecular distillation before it is rechlorinated, but this step is not essential to our invention. If the rechlorination is permitted to go to completion the final products contain 50-60% of chlorine.

As many apparently widely different embodiments of this invention may be made without departing from the spirit and scope thereof, it is to be understood that we do not limit ourselves to the specific embodiments thereof except as defined in the appended claims.

We claim:

1. A process for the manufacture of new chlorinated derivatives of paraffin wax which comprises reacting chlorinated paraffin wax having a chlorine content of at least about 20% with alcoholic alkali so as to obtain unsaturated derivatives of paraffin wax and then chlorinating the said unsaturated derivatives with elemental chlorine to a chlorine content of at least about 40%.

2. A process for the manufacture of new chlorinated derivatives of paraffin wax which comprises reacting chlorinated paraffin wax having a chlorine content of at least about 20% with alcoholic alkali so as to obtain unsaturated derivatives of paraffin wax, separating these unsaturated derivatives by molecular distillation, and then chlorinating said unsaturated derivatives with elemental chlorine to a chlorine content of at least about 40%.

3. A process as claimed in claim 1 where the final stages of the rechlorination are effected at a temperature of 80°-90° C.

4. A process as claimed in claim 2 where the final stages of the rechlorination are effected at a temperature of 80°-90° C.

5. As new products chlorinated derivatives of paraffin wax manufactured by the process claimed in claim 1.

6. As new products chlorinated derivatives of paraffin wax manufactured by the process claimed in claim 2.

7. As new products resin-like chlorinated paraffin wax containing 50 to 60 per cent of chlorine.

8. As a new product a resin-like chlorinated derivative of paraffin wax being composed of 42.4 per cent of carbon, 5.6 per cent of hydrogen and 52.0 per cent of chlorine.

9. As a new product a resin-like chlorinated derivative of paraffin wax being composed of 41.3 per cent of carbon, 5.7 per cent of hydrogen, and 53.0 per cent of chlorine.

10. As a new product a highly viscous liquid derivative of paraffin wax being composed of 49.6 per cent of carbon, 7.4 per cent of hydrogen, and 43 per cent of chlorine.

DAVID W. F. HARDIE.
CHARLES OCKRENT.

CERTIFICATE OF CORRECTION.

Patent No. 2,130,952.  September 20, 1938.

DAVID WILLIAM FERGUSON HARDIE, ET AL.

It is hereby certified that error appears in the printed specification of the above numbered patent requiring correction as follows: Page 1, second column, line 18, for "we do find" read we do not find; and that the said Letters Patent should be read with this correction therein that the same may conform to the record of the case in the Patent Office.

Signed and sealed this 6th day of December, A. D. 1938.

Henry Van Arsdale (Seal)  Acting Commissioner of Patents.